United States Patent [19]
Yamaguchi et al.

[11] Patent Number: 5,899,262
[45] Date of Patent: May 4, 1999

[54] AIR DUCT SELECTOR

[75] Inventors: Hiroyuki Yamaguchi, Aichi-gun; Kazunori Saida, Kariya; Yasuhiko Sumiya, Hekinan, all of Japan

[73] Assignee: Nippondenso Co. Ltd., Kariya, Japan

[21] Appl. No.: 08/620,582

[22] Filed: Mar. 22, 1996

[30] Foreign Application Priority Data

Mar. 23, 1995 [JP] Japan .................................... 7-064116

[51] Int. Cl.$^6$ .................................................. F25B 29/00
[52] U.S. Cl. .............................. 165/42; 165/43; 165/103; 237/12.3 A; 237/12.3 B; 251/175; 251/901; 251/356; 251/326; 454/121; 454/126; 454/156; 454/69
[58] Field of Search ..................... 251/175, 901, 251/356, 326; 165/42, 43, 103; 237/12.3 A, 12.3 B; 454/121, 126, 156, 69

[56] References Cited

U.S. PATENT DOCUMENTS

| | | | |
|---|---|---|---|
| 2,101,991 | 12/1937 | Finley et al. | 251/175 |
| 3,381,706 | 5/1968 | Hendey | 251/901 |
| 3,773,077 | 11/1973 | Barnebey | 251/901 |
| 4,084,616 | 4/1978 | Tragert | 251/901 |
| 4,164,211 | 8/1979 | Onnen | 251/175 |
| 5,105,730 | 4/1992 | Smith | 251/901 |
| 5,564,979 | 10/1996 | Sumiya et al. | 454/121 |
| 5,699,851 | 12/1997 | Saida et al. | 165/42 |

FOREIGN PATENT DOCUMENTS

| | | |
|---|---|---|
| 681934 | 11/1995 | European Pat. Off. . |
| 2704522 | 8/1978 | Germany . |
| 2-15508 | 1/1990 | Japan . |
| 4-257720 | 9/1992 | Japan . |
| 6-071222 | 10/1994 | Japan . |
| 2134220 | 8/1984 | United Kingdom . |
| 2134220 | 8/1994 | United Kingdom . |

OTHER PUBLICATIONS

SN 08/320,609, Okamoto et al. Filed Mar. 22, 1996.
SN 08/633,082, Saida et al. Filed Apr. 18, 1996.
SN 08/624,837, Yamaguchi et al. Filed Mar. 22, 1996.

*Primary Examiner*—John K. Ford
*Attorney, Agent, or Firm*—Cushman Darby & Cushman IP Group of Pillsbury Madison & Sutro LLP

[57] ABSTRACT

In an air duct selector, a supporting member has a grid shape, and is formed with four penetration holes. Since a film member is affixed to two fitting portions which are arranged on two ends of the supporting member, the film member is fixed on the supporting member. The supporting member and the film member are arranged in a duct to move in a vertical direction. When air flow is blown against the inside surface of the film member through the penetration holes 24a~24d, the film member is bent to swell against the film member, and presses against a peripheral portion of a cool air bypass opening portion to entirely cover the cool air bypass opening portion.

20 Claims, 6 Drawing Sheets

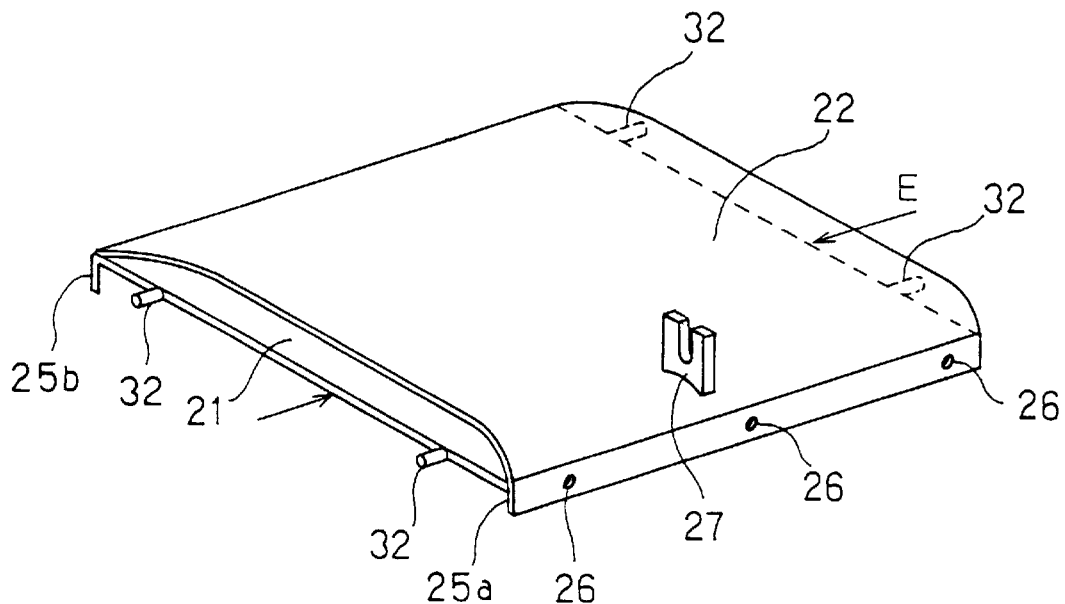
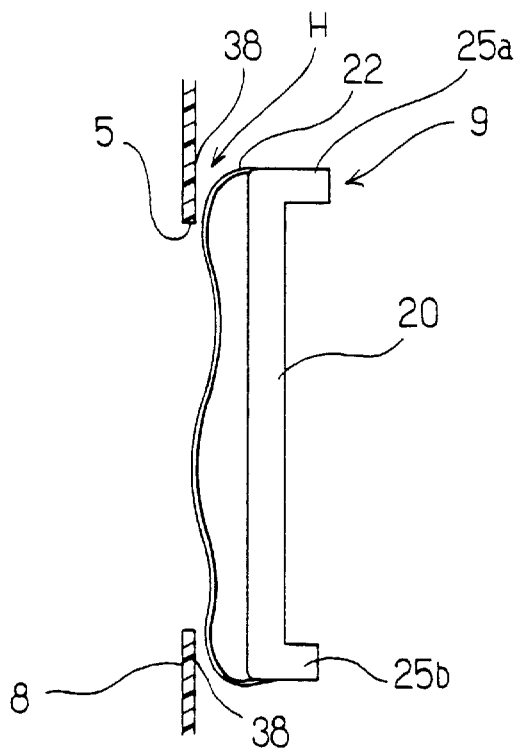
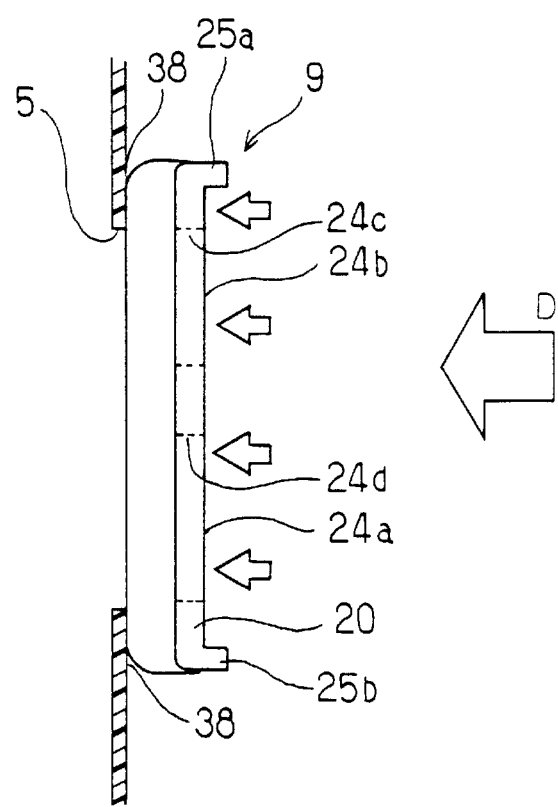

AIR DUCT SELECTOR

CROSS-REFERENCE TO RELATED APPLICATION

This application is related to and claims priority from Japanese Patent Application No. Hei. 7-64116, incorporated herein by reference.

BACKGROUND OF THE INVENTION

1. Field of the Invention

The present invention relates to a compact automotive air conditioner and, more particularly, to an air duct selector used in such a device.

2. Description of the Related Art

Conventional temperature controlling methods of an automotive air conditioner can be roughly classified into two groups; that is, a reheat system and an air mix system. Firstly, in the reheat system, an evaporator and a heater core are arranged in an air duct to completely close the air passage in the duct. By adjusting a heating power of the heater core, a desired air temperature is achieved. In the other system, i.e., in the air mix system, a bypass passage in which air passing through an evaporator detours around a heater core is installed, and the ratio of air passing through the bypass passage to that passing through the heater core is adjusted by the air mix door to provide a desired air temperature.

Incidentally, the reheat system and the air mix system have both good points and bad points. In the reheat system, because a space accommodating the air mix door is not needed, the size of the air conditioner becomes smaller. However, in the reheat system, because the air passing through the evaporator always passes through the heater core, air resistance is increased, and a required amount of mixed air cannot be obtained when the heating power of the heater core is zero, for example.

In the other system, i.e., in the air mix system, in a maximum cooling mode, because the air is not sent to the heater core, the air resistance can be decreased. However, in the air mix system, because space is needed for rotating the air mix door, there is a problem in that the size of the air conditioner becomes larger.

A conventional system has been disclosed in which the air resistance is not increased and the size of the air conditioner itself is not increased to control the air temperature, for example, in Japanese Patent Publication Laid-Open No. Hei 4-257720. In that system, opening and closing of an air passage and mixing of the warm air and the cool air are controlled by a thin film member, and miniaturization of the air conditioner is achieved.

However, in such a conventional air conditioner, because a drive shaft is needed for doing storage and rewind at the end of the film (similar to a film canister), there are problems in that the air conditioner needs a large number of components and the cost becomes very high.

Further, an air conditioner is disclosed in Japanese Utility Model Laid-Open Publication No. Hei 6-71222 in which the air mix door is not a rotating system, but instead is a sliding door which vertically slides relative to a direction of air flow, and thereby a ratio of cool air to warm air is controlled.

However, in the above-described sliding door of the air conditioner, though a mixing ratio of cool air to warm air is controlled by the sliding door, for example, in the maximum cooling mode, there is a problem in that cooling power is decreased when a space between the sliding door and the casing of the air conditioner is not entirely sealed as the air is leaked through the slide door to the heater core. Besides, in Japanese Utility Model Laid-Open Publication No. Hei 6-71222, a sealing structure is not installed between the sliding door and the air conditioning case, and the structure cannot be sealed for practical use.

Thus, it is conceivable that the space between the sliding door and the air conditioning case may be sealed by a seal on the sliding door, for example. However, when such a seal is put on the sliding door and the sliding door simply moves in a straight line, because the seal is pressed against the air conditioning case, there is a problem in that the amount of force required to control the sliding door becomes larger. Further, the seal may come off by repeated actuation of the sliding door; therefore the sliding door air does not adequately seal the air passage.

SUMMARY OF THE INVENTION

In view of the above-described problems of the prior art, it is an object of the present invention to provide an air duct selector which accommodates a sliding door therein to provide a compact structure and to prevent an increase of control force necessary to reliably form a seal between the sliding door and a casing of the system.

According to a first aspect of the present invention, the above object is achieved by providing a supporting member, for supporting a film member, which is in a nearly flat plate shape and the supporting member having the film member disposed thereon moves in a plane to selectively close air blow openings, so that an actuation area required for operating the member can be smaller than that required for the rotating door of the conventional construction. Thus, the size of the air duct selector can be become smaller.

Preferably, when the film member closes the air blow opening portion, the film member is bent to swell at the side of the air blow opening portion with an air pressure of the air flowing in the duct, and the film member is pressed to the peripheral portion of the air blow opening portion. Therefore, the air blow opening portion can be excellently sealed. Further, since the air blow opening portion is sealed by the air pressure, though the film member and the supporting member are moved, it is possible to decrease the control force more so than a case where the portion is sealed with packing material, for example.

More preferably, because the film member and the supporting member are arranged between the evaporator and the heater core, and the cool air bypass opening portion and the heating opening portion open at the same flat surface, by moving the supporting member, the opening area of the cool air bypass opening portion and the heating opening portion can be adjusted by the film member.

Still more preferably, because the supporting member is arranged so that the extended direction of the flat plate is nearly perpendicular to the flow direction of the air flowing in the duct, and the supporting member moves in the extended direction, the actuation area require for the supporting member can be as small as possible.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is an assembly drawing of the supporting member and the film member in the embodiment;

FIG. 6 is a top view showing the state of the film member in permitting the flow of air in the embodiment;

FIG. 7 is a top view showing the state of the film member in stopping the flow of air in the embodiment;

DETAILED DESCRIPTION OF PRESENTLY PREFERRED EMBODIMENTS

A presently preferred exemplary embodiment of the present invention will be described below with reference to the accompanying drawings.

Figure 1:
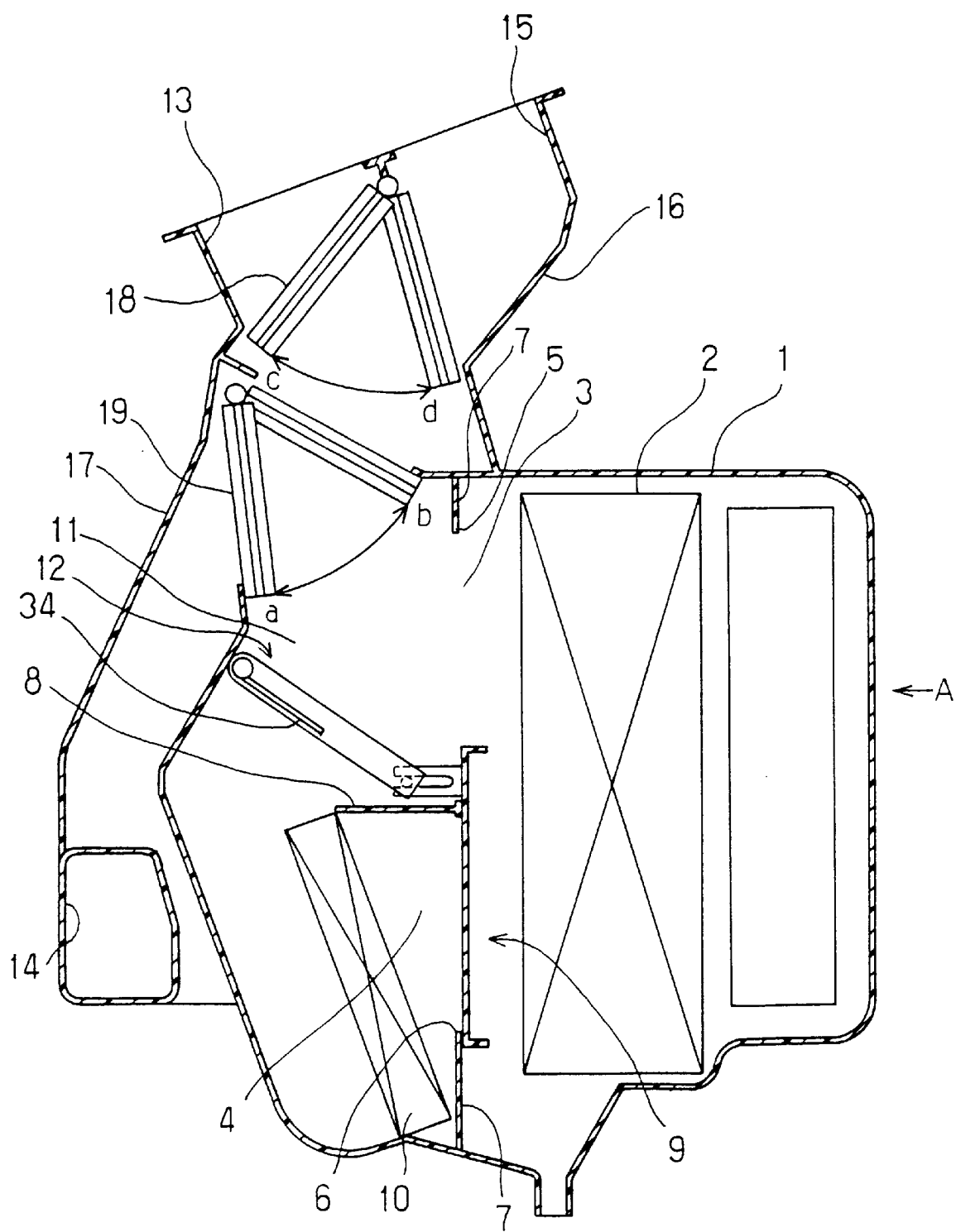
FIG. 1 is a schematic diagram showing the construction of an entire automotive air conditioner in accordance with a preferred embodiment of the present invention which shows the driving position of the air amount adjustment system in the maximum cooling mode.

Referring to FIG. 1, an automotive air conditioner duct system can roughly be classified into two sections, which are: a duct 1 for directing air into a passenger compartment; and functional components of the air conditioning duct system which are arranged in the duct 1.

The duct 1 is formed from a resin material such as polypropylene. In a most upstream position of the duct 1 (i.e., the back side of the paper in FIG. 1), there is arranged an inside and outside air selector (not shown). This selectively directs the air which is drawn into the duct 1 to be inside air (i.e., the air inside the passenger compartment) or outside air (i.e., the air outside the passenger compartment).

Further, in a downstream position of the inside and outside air selector (i.e., the back side of the paper in FIG. 1), a blower (not shown) which generates an air flow is arranged in the duct 1 facing the passenger compartment. The inside air or the outside air which is selected by the above-described inside and outside air selector is taken in by the blower, and an air flow is generated to the face of a passenger in the passenger compartment.

In the duct 1, an evaporator 2 for cooling the passing air is arranged downstream of the blower. The evaporator 2 is one portion of a refrigeration cycle (not shown) which is mounted in an automobile. It is common knowledge that the refrigeration cycle is formed with a compressor for compressing a coolant to high pressure using drive power from the car, a condenser for condensing the high pressure coolant, an expansion valve for expanding the condensed coolant, and the above-described evaporator 2 for evaporating expanded coolant.

Further, a cool air bypass passage 3 and heating passage 4 branch downstream of the evaporator 2 in the duct 1. Upstream position of the respective cool air bypass and heating passages, there is formed a cool air bypass opening portion 5 for sending the air passing through the evaporator 2 into the cool air bypass passage 3, and a heating opening portion 6 for sending the air passing through the evaporator 2 into the heating passage 4.

As shown in FIG. 1, the cool air bypass opening portion 5 and the heating opening portion 6 open in the same plane, and are constructed with an overhanging portion 7 protruding from an internal surface of the duct 1 and a partition 8 placed in the center of the duct 1 as shown in FIG. 1. Further, the opening shape between the cool air bypass opening portion 5 and the heating opening portion 6 is nearly a rectangle when seen from the direction indicated by the arrow A in FIG. 1.

The partition 8 protrudes to the left in FIG. 1 for partitioning the cool air bypass passage 3 and the heating passage 4. Thus, the air which is blown into the heating opening portion 6 may be entirely sent to a heater core 10. The heater core 10 will be described below. On the other hand, the air which is blown into the cool air bypass opening portion 5 may be entirely detoured around the heater core 10.

An air amount adjustment system 9 (i.e., an air duct selector in the appended claims) is arranged downstream of the evaporator 2 and upstream of the cool air bypass opening portion 5 and heating opening portion 6. The air amount adjustment system 9 controls the amount of the air passing through the evaporator 2 which is sent into each of the cool air bypass passage 3 and heating passage 4. The air amount adjustment system 9 will be described later.

Further, the heater core 10 which heats air passing therethrough is arranged in the heating passage 4, and the air passing through the heating passage 4 may be always passed through the heater core 10. Since cooling water of an engine is the heat source of the heater core 10, the amount of cooling water which flows inside the heater core 10 is controlled, and the cooling water of the engine is thereby intermittently supplied to the heater core 10, the heater core 10 can be given necessary heating power.

An air mix chamber portion 11 (i.e., an air mixture portion in the appended claims) is installed downstream of the cool air bypass passage 3 and heating passage 4 to mix cool air and warm air which passed through the cool air bypass passage 3 and heating passage 4 respectively. Specifically, since the cool air which flowed through the cool air bypass passage 3 and the warm air which flowed through the heating passage 4 are mixed in the air mix chamber portion 11, it is possible to get a desired and conditioned air temperature.

Further, an adjustment member 12 is arranged in the air mix chamber portion 11 to control the air flow direction of cool air and warm air which is blown out into the cool air bypass passage 3 and heating passage 4. The adjustment member 12 will be later described with the air amount adjustment system 9.

The duct 1 downstream of the air mix chamber 11 branches into two communicating passages 16 and 17. With the communicating passages 16 and 17, the conditioned air of which the air temperature is adjusted in the duct 1 is directed into the passenger compartment. As shown in FIG. 1, the communicating passage 16 extends into an upper portion of FIG. 1, and the communicating passage 17 extends into a lower portion of FIG. 1.

Downstream of the communicating passage 16, there are arranged outlets which open into the passenger compartment. Concretely, there are arranged a face outlet 13 for directing the conditioned air toward the upper part of a passenger and a defroster outlet 15 for directing the conditioned air toward the inner surface of a windshield.

Moreover, downstream of the communication passage 17, there is arranged a foot outlet 14 for directing the conditioned air toward the lower part of the passenger.

In the branch portion of the communication passages 16 and 17, there is arranged a change door 19 which selectively blows air into the communication passage 16 or the communication passage 17. Specifically, when the change door 19 is changed to the position a as shown in FIG. 1, the conditioned air is entirely sent into the communication passage 16, and when the change door 19 is changed to the rotation position b as shown in FIG. 1, the conditioned air is entirely sent into the communication passage 17 to blow out from the foot outlet 14.

Further, downstream of the communication passage 16, there is arranged a change door 18. The change door 18 determines whether the conditioned air which is sent into the communication passage 16 is blown out from the face outlet 13 or from the defroster outlet 15. Concretely, when the change door 19 is changed to the position a as shown in FIG. 1, and the change door 18 is changed to the rotation position c as shown in FIG. 1, the conditioned air is blown out from the defroster outlet 15. When the change door 19 is changed to the rotation position a as shown in FIG. 1, and the change door 18 is changed to the rotation position d as shown in FIG. 1, the conditioned air is blown out from the face outlet 13.

Here, the above-described air amount adjustment system 9 and adjustment member 12 will be described.

Figure 4:
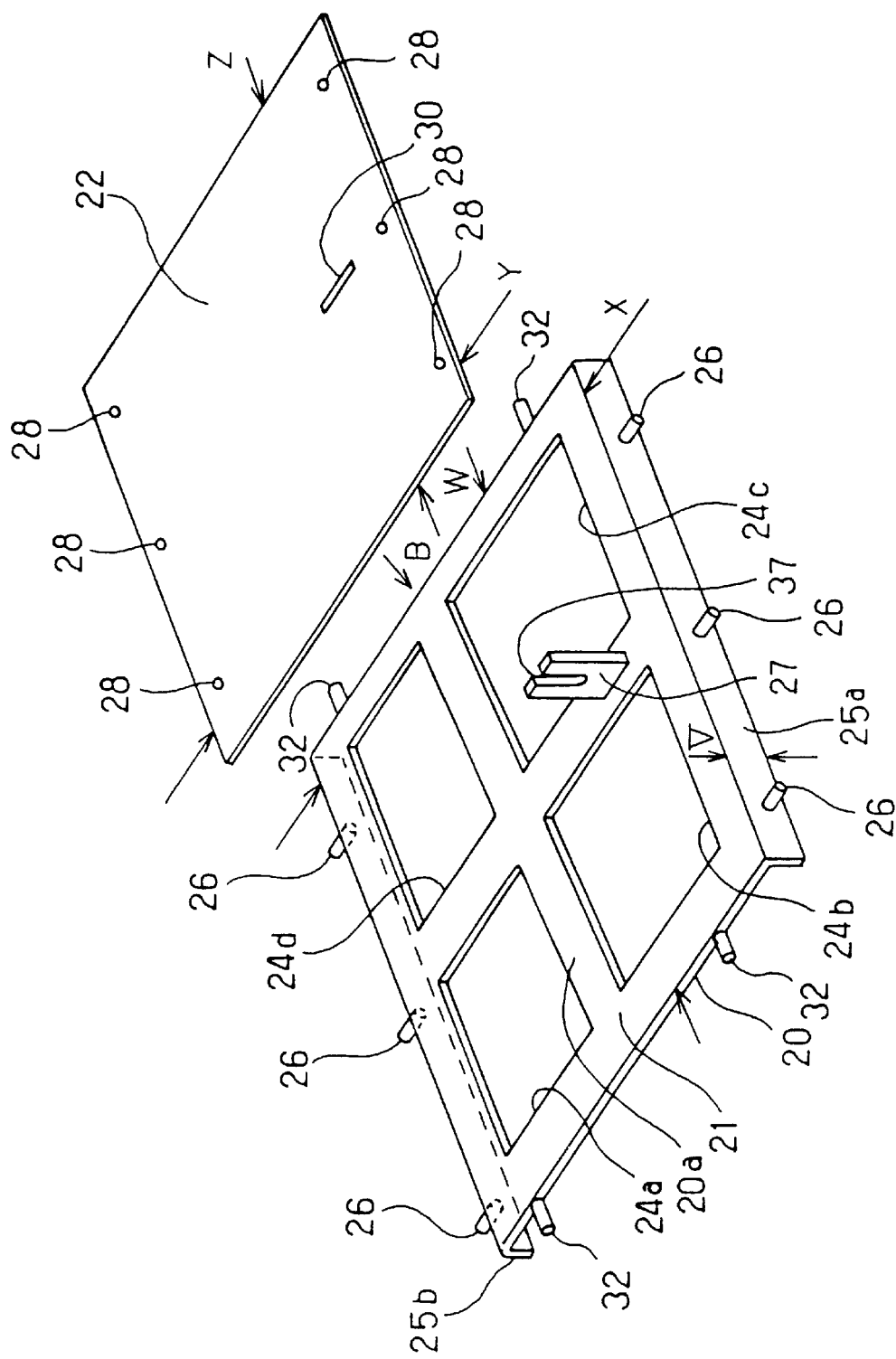
FIG. 4 is an perspective view of the supporting member and the film member in the embodiment.

As shown in FIG. 4, the air amount adjustment system 9 is formed with a supporting member 20 having nearly a flat plate shape and a film member 22 which is arranged to cover a flat surface portion 21 of the supporting member 20.

The supporting member 20 is formed from a resin material such as polypropylene, and an outline of the supporting member 20 is nearly rectangular in shape. Since the supporting member 20 is formed with four penetration holes (24a to 24d), the supporting member 20 which has a cross supporting member 20a has a grid shape.

Figure 2:
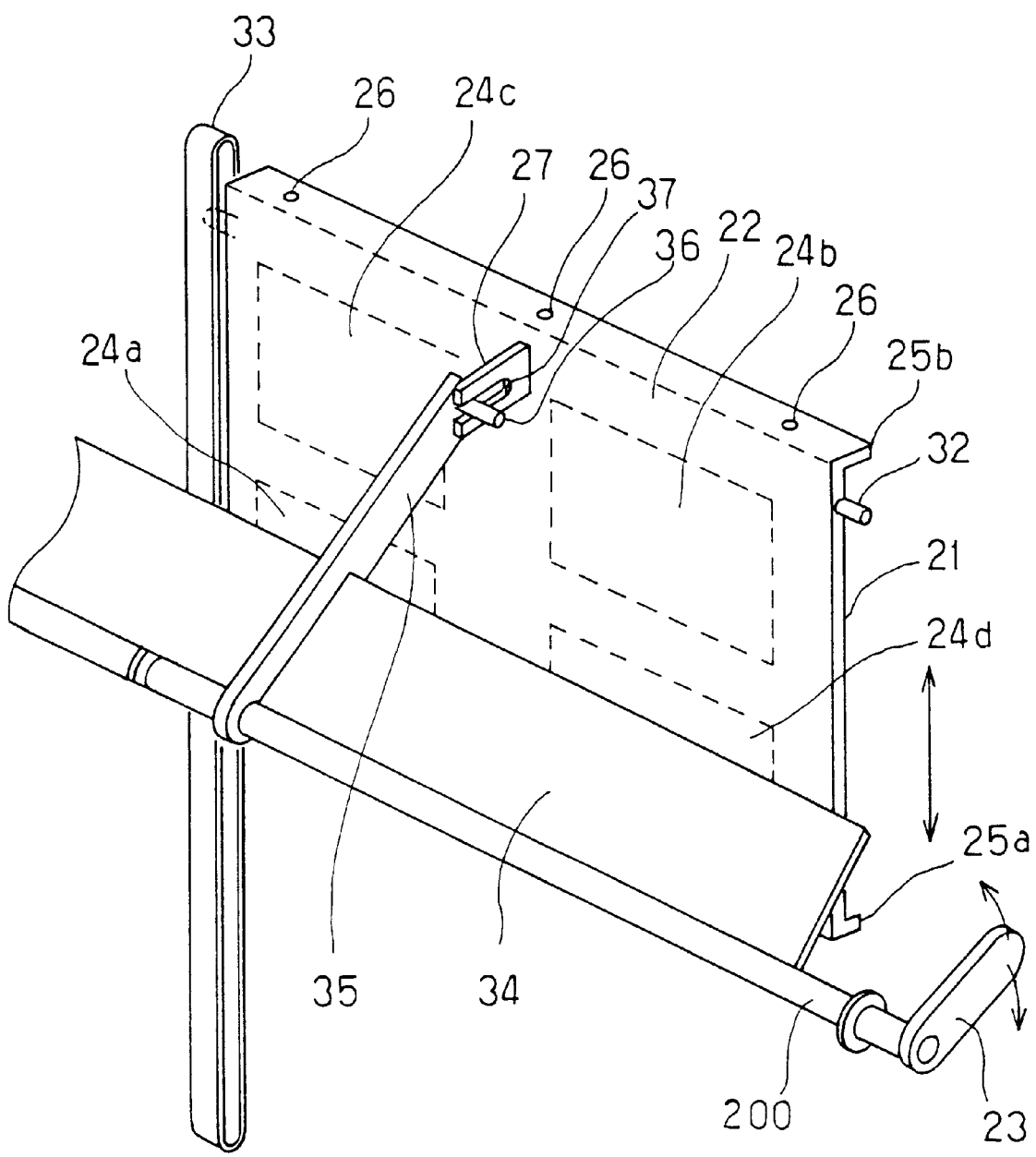
FIG. 2 is a perspective view showing the contained holding state of the air amount adjustment system in the duct of the embodiment.

Further, at two end portions of the supporting member 20 (the two ends which are at the front side and the back side in FIG. 2), there are formed fitting members 25a and 25b which extend nearly vertically in FIG. 2. On an outside surface of the fitting member 25a and 25b, there are formed protruding portions 26 which protrude at even intervals. As will be later described, the film member 22 is fitted to the supporting member 20 with the fitting members 25a and 25b.

On the two end surfaces of the supporting member 20 in the horizontal direction (i.e., left-right) in FIG. 2, there are formed cylindrical holding portions 32 which protrude from the two end surfaces to hold the supporting member 20 so that it can be moved in the duct 1. Moreover, on an upper surface of the supporting member 20a of the supporting member 20, there is formed a bearing portion 27 having a bearing slot 37.

The film member 22 is a film having flexibility, no permeability, and a small coefficient of friction, such as a 75 μm PET film, and has a nearly rectangular shape. The size of the film member 22 is set as follows: one width of the film member 22 (the width perpendicular to the arrow Z in FIG. 2) equals one width of the supporting member 20 (the width perpendicular to the arrow W in FIG. 2), and the other width of the film member 22 (the width perpendicular to the arrow Y in FIG. 2) is larger than the corresponding width of the supporting member 20 (the width perpendicular to the arrow X in FIG. 2) added to the total width of the fitting portions 25a and 25b (twice the width between the arrows V in FIG. 2).

The two end portions of the film member 22 are formed with fitting holes 28 at the same intervals as the protruding portions 26 which are formed in the supporting member 20. In the film member 22, there is formed an inserting hole 30 in which the above-described bearing portion 27 is inserted.

In fitting the film member 22 to the supporting member 20, first, the three fitting holes 28 on one end side of the film member 22 receive the protruding portions 26 of the supporting member 20 which are disposed at corresponding intervals; then, the other three fitting holes 28 receive the other respective protruding portions 26 as the bearing portion 27 of the supporting member 20 is inserted into the inserting hole 30. Then, since the protruding portions 26 are melted by a heating system (not shown), for example, and the film member 22 is fusion-bonded on the fitting portions 25a and 25b so that the film member 22 is fixed on the supporting member 20 (see FIG. 3).

Since the width of the film member 22 is set as described above, the horizontal width of the film member 22 and supporting member 20 (the width perpendicular to arrow E in FIG. 3) have identical widths to pile up on each other. As for the other width, in the vertical direction (the width perpendicular to arrow F in FIG. 3), since the width of the film member 22 is larger than the width of the supporting member 20, the film member 22 is bent in an arch shape to form a space between the flat surface portion 21 of the supporting member 20 and the film member 22 as shown in FIG. 3.

The supporting member 20 and film member 22 are fitted in the duct 1. As shown as FIG. 1, the duct 1 can be divided into a front side and a back side. On each of an internal surface of the duct 1 on its front side and an internal surface of the duct 1 on its back side, there is formed a guide slot 33 (i.e., an accession portion as recited in the appended claims) having an elongated hole shape as shown in FIG. 2. The extended direction of the slot 33 is nearly perpendicular to the direction of air flowing in the duct 1, and the extended direction of the slot is nearly parallel to the plane in which the cool air bypass opening portion 5 and heating opening portion 6 open. The guide slot 33 is arranged upstream of the cool air bypass opening portion 5 and heating opening portion 6, and near these opening portions.

One side of the holding portion 32 of the supporting member 20 is inserted into the guide slot 33 of one duct side, and the other side of the holding portion 32 of the supporting member 20 is inserted into the guide slot 33 of the other duct side. Thus, the supporting member 20 is sandwiched between the two duct sides to be contained in and held in the duct 1.

Further, the extended direction of the flat surface portion 21 of the supporting member 20 is arranged nearly perpendicular to the direction of air flowing in the duct 1, and the supporting member 20 moves along the guide slot 33; therefore, the supporting member 20 always moves in the extended direction. Further, the fitting portion 25a and 25b are placed on the two end sides of the supporting member 20 perpendicular to the moving direction of the supporting member 20.

The above-described adjustment member 12 will be detailed with reference to FIG. 2.

The adjustment member 12 is formed from a resin material such as polypropylene. The adjustment member 12 is constructed with a drive shaft 200, one end of which is supported by the duct 1 for making rotation possible, a adjustment portion 34 which is located on the drive shaft 200 for adjusting the direction of the air flow in the duct 1, and an arm portion 35 which has one end connected to the drive shaft 200 and the other end engaged with the bearing portion 27 of the supporting member 20 via a cylindrical engaging portion 36.

One end (not shown side in FIG. 2) of the drive shaft 200 is supported by the outside surface of the duct 1 for making rotation possible. The other end of the drive shaft 200 protrudes to an outside surface of the duct 1 and connects to a drive member 23 which is a driving means for driving the drive shaft 200.

The adjustment portion 34 is formed along the direction of the drive shaft 200 to have a flat plate shape. Further, the direction of the adjustment portion 34 is changed by rotating the drive shaft 200. The arm portion 35 is formed near a center position of the drive shaft 200 along the length of the shaft. One end of the arm portion 35 is connected to the drive shaft 200, the other end of the arm portion 35 has the cylindrical engaging portion 36, and the engaging portion 36 is inserted into the bearing slot 37 of the bearing portion 27.

Specifically, with the drive shaft 200 rotating, the direction of the adjustment portion 34 is changed. Since the arm portion 35 is also rotated with the drive shaft 200, the position of the engaging portion 36 of the arm portion 35 moves in a vertical direction in FIG. 2. As a result, with the bearing portion 27, the supporting member 20 moves in a vertical direction in FIG. 2 (the direction is nearly perpendicular to the direction of air flowing in the duct 1) in the guide slot 33.

Here, driving of the air amount adjustment system 9 and the adjustment system 12 is described with reference to FIG. 1 and FIGS. 5 to 8. For example, with the driving member 23 as a driving means, the air amount adjustment system 9 and the adjustment system 12 are driven to cooperate by a control cable and a servo motor (not shown).

Firstly, the maximum heat operating mode will be described.

Figure 5:
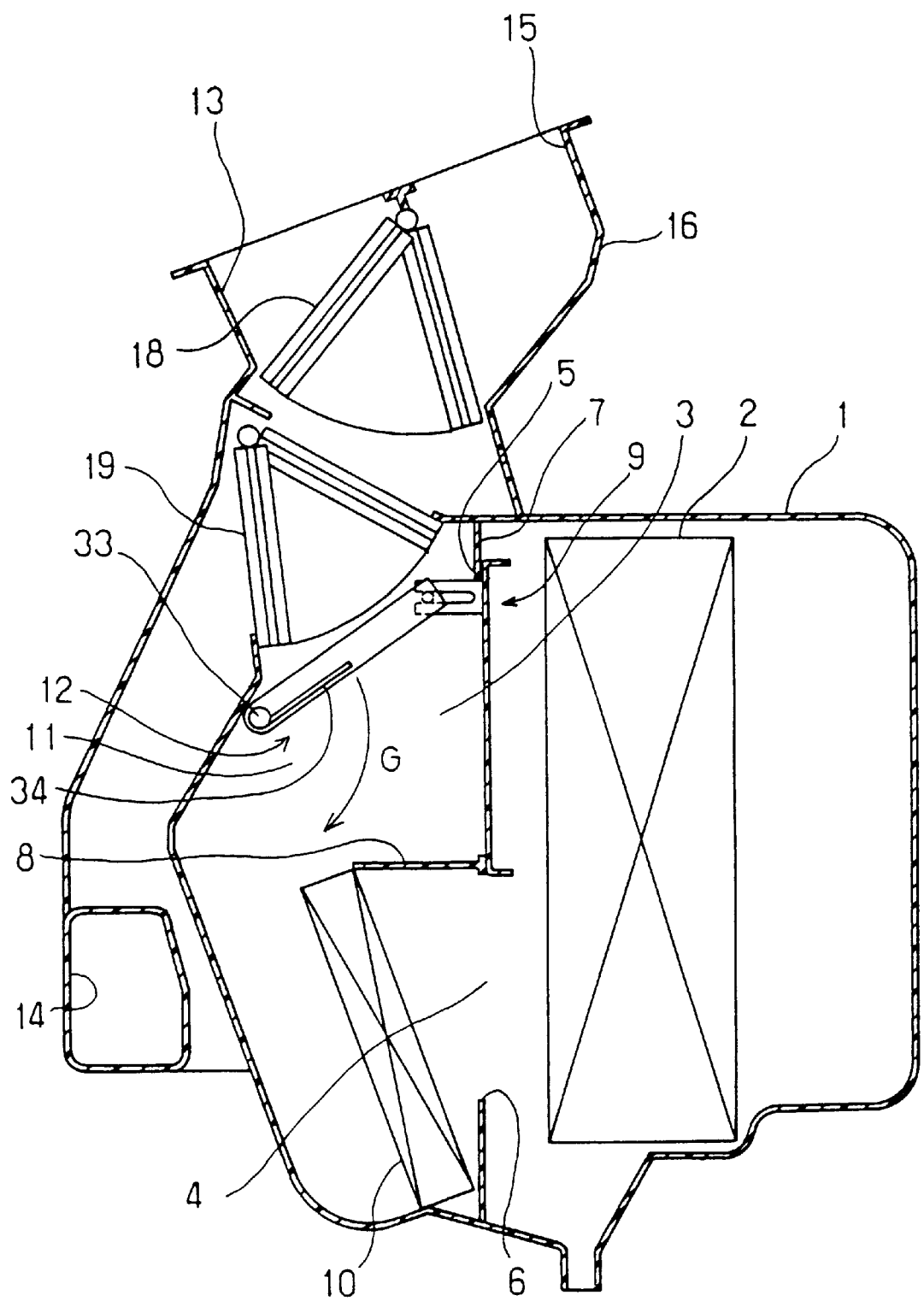
FIG. 5 is a cross-sectional view showing the driving position of the air amount adjustment system in the maximum heating mode in the embodiment.

FIG. 5 shows a driving position in which the supporting member 20 and film member 22 are placed at a top position in the duct 1, and this is the driving position for entirely opening the heating opening portion 6 and entirely closing the cool air bypass opening portion 5. Specifically, the air passing through the evaporator 2 is entirely sent to heater core 10. In this condition, the typical form of the film member 22 is shown in the top views of FIGS. 6 and 7.

That is, FIG. 6 shows the condition of the film member 22 when the blower is stopped, and FIG. 7 shows the condition of the film member 22 when the blower is driven.

As shown in the top view of FIG. 6, when the blower is stopped, the film member 22 keeps its natural form, and between the peripheral portion 38 of the cool air bypass opening portion 5 and the film member, there exists a little space. However, as shown in FIG. 7, the air passing through evaporator 2 (arrow D in FIG. 7) passes through the penetration holes 24a~24d to blow against the inner surface of the film member 20. Due to the air pressure, the film member 22 is bent to swell toward the left in FIG. 7. Since the film member 22 presses against the peripheral portion 38 to form a seal, the cool air bypass opening portion 5 is entirely covered.

Thus, in the maximum heat mode, the air does not leak from the cool air bypass opening portion 5, and the air passing through the evaporator 2 is entirely blown into the heating passage 4. For the following reason, the fitting portions 25a and 25b are placed on two ends perpendicular to the moving direction of the supporting member 20 rather than on the ends parallel thereto.

For example, if the fitting portions 25a and 25b are placed rather than on the parallel ends, when the supporting member 20 and film member 22 move from the top (i.e., above the page in FIG. 6 or 7) to bottom (i.e., below the page in FIG. 6 or 7), though the moving distances and the position relations with the peripheral portion 38 are also influenced, because the film member 22 is bent to the left in FIG. 6 by the air pressure, the film member 22 can interact with the peripheral portion 38, and the film member 20 cannot be certainly sealed. As a result, the supporting member 20 cannot be moved.

Since the fitting portions 25a and 25b are constructed as in the present embodiment, though the film member 22 interacts with the peripheral portion 38, because an interaction portion (for example, as shown by arrow H in FIG. 6) of the film member 22 is constructed with a continuous curved surface, the above-described interaction problem does not exist.

Moreover, in this condition, the adjustment portion 34 of the adjustment member 12 (shown in FIG. 2) is at a driving position to open the opening area of an outlet side of the heating passage 4 to the maximum extent possible.

Secondly, the air mix mode will be described with reference to FIG. 8. In the air mix mode, the air passing through evaporator 2 is sent into both passages of the cool air bypass passage 3 and the heating passage 4 by the air amount adjustment system 9.

Figure 8:
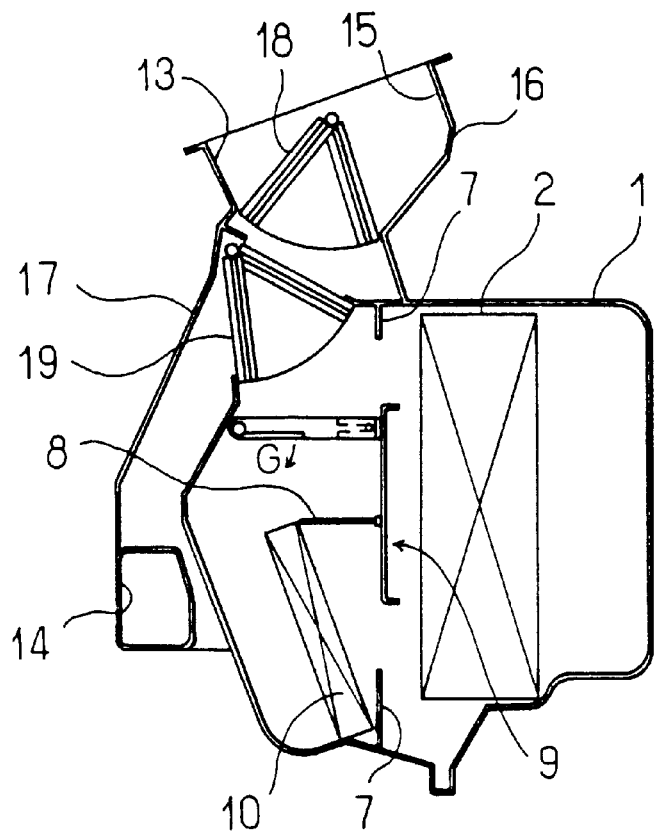
FIG. 8 is a cross-sectional view showing the driving position of the air amount adjustment system in an air mix mode in the embodiment.

In the air mix mode, since the supporting member 20 and the film member 22 are placed near the center portion of the duct 1 as shown in FIG. 8, a ratio of the opening area of the cool air bypass opening portion 5 to the opening area of the heating opening portion 6 can be adjusted, the air is mixed in the air mix chamber 11, and a desired conditioned air temperature is achieved.

Since the air which is sent to the cool air bypass opening portion 5 might leak from the space between the partition portion 8 and the film member 22 to go into the heating passage 4 without the film member, there is a problem that a desired air mix rate cannot be achieved. Similarly, since the air which is sent to heating opening portion 5 might leak from the space between the partition portion 8 and the film member 22 to go into the cool air bypass passage 3 without the film member, there is the same problem that a desired air mix rate cannot be achieved.

However, because the air passing through evaporator 2 is blown into film member 22 through the penetration holes 24a~24b, the film member 22 bends to form a seal against the side of the partition portion 8, and the film member 22 presses against the end face of the partition portion 8. Thus, the above-described problems can be avoided.

Specifically, with the film member 22, the opening areas of the cool air bypass passage 5 and the heating passage 6 are adjusted. Moreover, the supporting member 20 supports the film member 22 which is bent by the pressure of flowing air to swell, and the film member 22 is thereby pressed against the peripheral portion 38 to form a seal thereagainst.

Moreover, in the air mix mode, compared with the state as shown in FIG. 5, the adjustment portion 34 of the adjustment member 12 is rotated in the direction as shown by arrow G in FIG. 5. Therefore, the opening area of the outlet side of the heating passage 4 becomes smaller, and the adjustment portion 34 is rotated to cover the left side of the heating passage 4 in FIG. 8. Thus, the air passing through the heating passage 4 changes the flow direction of the air to blow out from the space between the film member 22 and the adjustment portion 34 (see FIG. 4) near the side of the cool air bypass opening portion 5. Hence, since the cool air which is blown out from the cool air bypass opening portion 5 strikes (i.e., mixes) easily with the warm air which is blown out from the space between the film member 22 and adjustment portion 34, it is possible to mix air excellently.

Further, the maximum cooling mode (the highest cooling state) as shown in FIG. 1 will be described.

As shown in FIG. 1, this is a state in which the supporting member 20 is placed at the bottom position of the duct 1 and the heating opening portion 6 is entirely closed, and the cool air bypass opening portion 5 is entirely opened. Specifically, the air passing through the evaporator 2 is all sent to the cool air bypass passage 3.

In the maximum cooling mode, since the state of the film member 22 is similar to its state in the above-described maximum heating mode, the description of the film member 22 will be omitted.

In the maximum cooling mode, the adjustment portion 34 of the adjustment member 12 rotates in the direction as shown by arrow G in FIG. 8 from the rotating position shown in FIG. 8 so that the opening area of outlet side of the heating passage 4 as small as possible. However, though the air does not flow into the heating passage 4, with radiated heat of the heater core (though the cooling water of the engine does not flow in the heater core 10, the heater core has a little heat), a little heated warm air might be mixed into the air mix chamber 11 as shown by the arrow in FIG. 1. Thus, there might be a problem in that the cooling power is decreased.

However, the adjustment portion 34 is placed at the driving position at which the opening area of the outlet of the heating passage 4 becomes as small as possible; moreover, the adjustment portion 34 acts as a wall since the warm air which is heated in the heater core is not mixed into the air mix chamber portion 11; therefore, the deterioration of the cooling power can be controlled to be a minimum.

Further, because the adjustment portion 34 is inclined to the left, the adjustment portion 34 prevents the air passing through the cool air bypass passage 3 from flowing into the heating passage 4, and the adjustment portion 34 performs a function of a guide in which the air is directed into the communicating duct 16 or the communicating duct 17.

Specifically, as the opening area of the cool air bypass opening portion 5 becomes larger (i.e., the opening area of the heating opening portion 6 becomes smaller), the adjustment portion 34 changes the flow direction of the air which is blown from the heating passage 4. Thus, in the air mix mode, the cool air and the warm air are mixed well using the adjustment portion 34, and in the maximum cooling mode, the adjustment portion 34 blocks radiated heat which is radiated from the heat core 10 and becomes a guide for directing the cool air flowing through the cool air bypass passage 3 into an outlet 16 or 17.

To summarize the above-described embodiments, since the supporting member 20 having the flat plate shape and the film member 22 move in the same direction as the plane of the flat plate, and are nearly perpendicular to the air flow direction in the duct 1, it is possible that the driving space of the supporting member 20 and the film member 22 becomes small. Concretely, when the present invention is compared with a conventional rotary air mixture door, it is possible that the width of horizontal direction in FIG. 1 becomes shorter and the size of the automotive air conditioner becomes smaller.

Further, due to the air pressure, the film member 22 is bent to swell, and the film member 22 is pressed against the peripheral portion 38 and the partition portion 8: therefore, the film member 22 can form a seal against the partition portion 8. Moreover, in this case, because the peripheral portion 38 and the partition portion 8 are sealed by the air pressure, it is possible to greatly decrease the control force relative to the case in which the supporting member is slid with a packing force, for example. Moreover, because the supporting member 20 and film member 22 move in the direction which is nearly perpendicular to the direction of the air flow in the duct 1, it is impossible to cause an increase of the control force with the air pressure.

Further, in the air mix mode, with the adjustment portion 34, it is possible to mix the air excellently; further, in the maximum cooling mode, it is possible to contain radiated heat from the heat core 10; therefore the cooling power is not decreased.

Figure 9:
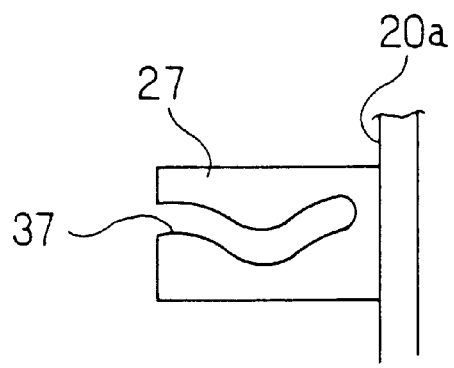
FIG. 9 is a schematic view showing a variation on the embodiment.

The present invention is not limited to the foregoing embodiments. For example, in the foregoing embodiment, the form of the bearing slot 37 is an extended straight line. However, a curved form as shown in FIG. 9 (and also any other suitable forms) may be applicable. Moreover, although only the arm portion 35 needs to cooperate with the supporting member 20, any other suitable constructions may be applicable.

Further, in the foregoing embodiment, the supporting member 20 is arranged to be nearly perpendicular to the direction of air flowing in the duct 1. However, as long as the film member 22 is bent by the air pressure to form a seal, the supporting member 20 may be inclined with respect to the air flow direction.

Further, in the foregoing embodiment, the supporting member 20 and the film member 22 are employed to determine the mixture ratio of the warm air and the cool air. However, an inside-outside air selector or other air changing device may also be employed.

Further, the foregoing embodiment is applied to an automotive air conditioner having an air duct selector. However, it may also be used in various devices for changing flow in ducts without departing from the spirit and scope of the invention.

What is claimed is:

1. An air duct selector comprising:

a duct for containing air flowing in the duct, said duct defining first and second paths therein;

an overhanging portion defining first and second coplanar airflow openings therein, said first and second paths respectively connecting to an upstream portion of said duct via said first and second airflow openings;

a supporting plate member having a flat major surface and disposed downstream from the air flowing in said upstream portion of said duct proximate to said first and second airflow openings and being slidable in a plane parallel to a plane containing said first and second openings, said flat major surface of said supporting plate member having at least one air penetration hole defined therethrough;

flexible film means, disposed on said supporting plate member, for pressing against said overhanging portion responsive to air pressure thereagainst from air flow into said at least one air penetration hole, to form a seal with said overhanging portion around at least one of said first and second airflow openings, thereby preventing air from flowing from said upstream portion through said at least one of said first and second openings.

2. An air duct selector according to claim 1, further comprising:

a holding portion on the supporting member for holding the supporting member so that it can be moved in the duct; and a holding accession portion which is installed in the duct for engaging the holding portion.

3. An air duct selector according to claim 2, wherein:

the holding portion has a protruding portion, and the holding accession portion has a guide slot into which the protruding portion is inserted.

4. An air duct selector according to claim 1 further comprising:
   an evaporator in the duct for cooling air passing therethrough; and
   a heater core which is installed in the duct for heating air passing therethrough,
   wherein the duct is an air passage of an automotive air conditioner for directing air into a passenger compartment of an automobile,
   the evaporator is upstream of the flexible film means and the supporting member, and
   the heater core is downstream of the flexible film means and the supporting member in the second path.

5. An air duct selector according to claim 4, wherein:
   the first opening is a cool air bypass opening portion for guiding air passing through the evaporator into said first path as a cool air bypass passage without passing through the heater core, and the second opening is a heating opening portion for guiding the air passing through the evaporator into the second path as a heating passage through the heater core,
   and
   the flexible film means controls a ratio of an opening area of the cool air bypass opening portion and an opening area of the heating opening portion.

6. An air duct selector according to claim 5, further comprising:
   an air mixture portion for mixing air which passed through the cool air bypass passage and the heating passage;
   wherein the air mixture portion is downstream of the cool air bypass passage and the heating passage, and
   the air mixture portion has an adjustment member for adjusting a flow direction of the air which is blown from at least one of the cool air bypass passage and the heating passage.

7. An air duct selector according to claim 6, wherein the adjustment member is connected to the supporting member to cooperate with the supporting member.

8. An air duct selector according to claim 7, wherein with an opening portion of the cool air bypass opening portion becoming larger due to movement of the supporting member, the adjustment member is for cooperating with the supporting member to decrease the opening area of the heating passage.

9. An air duct selector according to claim 5, wherein the supporting member is arranged in an extended direction of the plane including the supporting member which is substantially perpendicular to a flow direction of air in the duct, and the supporting member is moveable in the extended direction.

10. An air duct selector according to claim 1, wherein two ends of the supporting member each has two fitting portions extending in a direction perpendicular to a moving direction of said supporting member for fitting the flexible film means thereon.

11. An air duct selector according to claim 1, wherein the supporting member is formed with penetration holes for giving air pressure to the flexible film means.

12. An air duct selector according to claim 1, further comprising:
   a heater disposed in said first path downstream of said first opening; and
   a cool air bypass passage disposed in said second path for containing air flowing from said upstream portion of said duct and bypassing said heater.

13. An air duct selector system comprising:
   an air duct having an air inlet and an air outlet;
   a plurality of airflow opening portions in said duct for guiding air from said air inlet to said air outlet;
   a selector panel having a flat major surface selectively moveable from a first airflow position permitting air from said air inlet to flow into a first airflow opening portion of said plurality of airflow opening portions while at least partially blocking air from said air inlet from entering a second airflow opening portion of said plurality of airflow opening portions, to a second position at least partially blocking air from said air inlet from entering said first airflow opening portion while permitting air from said air inlet to flow into said second airflow opening portion; and
   a film member disposed on said selector panel adjacent said flat major surface, on a downstream side thereof, so that said film member is located upstream from, and proximate to, said first and second airflow opening portions, said selector panel having at least one air penetration hole defined therethrough, whereby air flow from said air inlet into said at least one air penetration hole displaces said film member to seal a corresponding one of said first and second airflow opening portions.

14. The air duct selector system of claim 13, wherein said selector panel is moveable in a direction perpendicular to a flow of air from said air inlet.

15. The air duct selector system of claim 14, wherein said plurality of opening portions are disposed in a common plane.

16. The air duct selector system of claim 13, further comprising:
   a heater core disposed downstream of said first opening portion; wherein
   said first opening portion is for guiding air from said air inlet through said heater core to said air outlet; and
   said second opening portion is for guiding air from said air inlet to said air outlet while bypassing said heater core.

17. The air duct selector system of claim 16, said selector comprising:
   an adjustment member rotatably disposed in said air duct; and
   a supporting member, connected to said adjustment member, for selectively moving to at least partially block said air from said air inlet from entering said first opening portion.

18. The air duct selector system of claim 17, wherein said adjustment member is for blocking air heated by said heater core from mixing with air entering said second opening portion.

19. The air duct selector system of claim 12, said selector comprising:
   an adjustment member rotatably disposed in said air duct; and
   a supporting member, connected to said adjustment member, for selectively moving to at least partially block said air from said air inlet from entering said first opening portion.

20. The air duct selector system of claim 19, wherein said supporting member has a penetration hole disposed therein for conveying said air pressure of air from said air inlet to said film member.

* * * * *